United States Patent
Karasek

(10) Patent No.: US 6,296,414 B1
(45) Date of Patent: Oct. 2, 2001

(54) SWIVEL JOINT MOUNTED IN THE CEILING AREA OF TWO HINGE-LINKED VEHICLES

(75) Inventor: Jens Karasek, Kaufungen (DE)

(73) Assignee: Hubner Gummi und Kunststoff GmbH, Kassel (DE)

( * ) Notice: Subject to any disclaimer, the term of this patent is extended or adjusted under 35 U.S.C. 154(b) by 0 days.

(21) Appl. No.: 09/346,244

(22) Filed: Jul. 1, 1999

(30) Foreign Application Priority Data

Mar. 19, 1999 (EP) .................................................. 99105624

(51) Int. Cl.[7] ............................... B61G 5/00; F16C 11/00
(52) U.S. Cl. .................................. 403/78; 403/127; 105/3
(58) Field of Search ................................. 403/161, 162, 403/164, 165, 24, 78, 79, 59, 60, 163, 127; 105/3, 4.1; 213/75 R, 62 R; 280/403

(56) References Cited

U.S. PATENT DOCUMENTS

| | | | |
|---|---|---|---|
| Re. 34,659 | * 7/1994 | Reilly | ............................... 403/162 X |
| 506,006 | * 10/1893 | Kreider | ................................. 403/161 |
| 2,529,898 | * 11/1950 | Batik | ...................................... 403/59 X |
| 3,111,334 | * 11/1963 | Krizman | ............................ 403/101 X |
| 3,923,349 | * 12/1975 | Herbst | ................................. 403/79 X |
| 4,808,023 | * 2/1989 | Arnold et al. | ..................... 403/79 X |
| 5,180,086 | * 1/1993 | Ikeda | ................................. 403/161 X |
| 5,586,506 | * 12/1996 | Heubusch et al. | ....................... 105/3 |
| 5,720,566 | * 2/1998 | Allen et al. | ....................... 403/162 X |
| 5,765,851 | * 6/1998 | Parent | ............................... 280/491.4 |
| 5,809,898 | * 9/1998 | Kaufhold et al. | .................... 105/3 X |
| 5,906,164 | * 5/1999 | Bildtsen | ................................. 105/3 |

* cited by examiner

Primary Examiner—Harry C Kim
(74) Attorney, Agent, or Firm—Thomas R. Vigil

(57) ABSTRACT

The object matter of the present invention is a swivel joint (1) mounted in the ceiling area of two hinge-linked vehicles having an arm (50) arranged on one of the vehicles, whereas the end of said arm may be rotatably seized by a claw (8), the claw (8) having two guide rods (10, 20) arranged in an angle relative to each other for the connection with the other vehicle, whereas the guide rods (10, 20) may be adjusted in length.

8 Claims, 2 Drawing Sheets

SWIVEL JOINT MOUNTED IN THE CEILING AREA OF TWO HINGE-LINKED VEHICLES

BACKGROUND OF THE INVENTION

1. Field of the Invention

The present invention relates to a swivel joint mounted in the ceiling area of two hinge-linked vehicles.

2. Description of the Prior Art

A known procedure for connecting two hinge-linked vehicles, for example of an articulated bus or of a corresponding rail vehicle, is to provided an articulation thrust bearing that ensures the connection of the two vehicles in the bottom area. Such an articulation thrust bearing has three degrees of freedom. An articulated vehicle exclusively provided with such an articulation thrust bearing would be unstable due to the motivity of the vehicles relative to each other in all the three degrees of freedom. That is why a swivel joint has to be provided, said swivel joint being mounted in the ceiling area of the two vehicles and limiting the number of degrees of freedom in which the vehicles may move relative to each other. This clearly shows that it is this upper swivel joint that is stabilizing the two hinge-linked vehicles.

In order to ensure a perfect functioning of the hinge joint as a whole between the two vehicles, it is necessary to have the hinge points of the upper and of the lower swivel joint exactly aligned above each other. If this is not the case, the two vehicles are displaced relative to each other.

SUMMARY OF THE INVENTION

The object of the present invention is therefore to provide a swivel joint of the type mentioned above that makes it possible to adjust the hinge points of the two swivel joint bearings arranged above each other in such a way that the hinge points are exactly aligned one above the other.

The solution of the invention is to provide an arm arranged on one of the vehicles, whereas the end of said arm may be rotatably seized by a claw, said claw having two guide rods arranged in an angle relative to each other for the connection with the other vehicle, whereas the guide rods are adjustable in length. Thanks to the adjustability of the guide rods's length, the two joints may be exactly aligned one above the other.

It has particularly been seen to it that the claw is provided with two claw elements, whereas each of the claw elements has a guide rod. The claw elements are rotatable relative to each other; thus, the angle between the two guide rods may also be changed which facilitates the mounting since the position of the eyes arranged on the ends of the guide rods so as to correspond to the bearing brackets of the other vehicle is adjustable.

Moreover, the claw is provided with a plain bearing ensuring a pivotable connection with the arm of the one vehicle; such a plain bearing is able to transmit high radial forces as they are required for example when the two hinge-linked vehicles are breaked, accelerated or elevated. Such a plain bearing is particularly composed of a spheroidal case having on its outer periphery a joint shell that may be fastened in the joint eye of the arm. A tension ring is provided to fasten the joint shell in the joint eye of the arm.

As already explained above, the two claw elements may be rotated relative to each other; hereby, the one claw element is provided with a claw mortise into which the tenon of the other claw element is engaging, whereas there is a clearance fit between tenon and mortise. Thanks to such a clearance fit, the rotation of the two claw elements relative to each other is possible. Thus, the angle between the two guide rods may be varied. According to another characteristic of the invention, the two claw elements are provided for their connection with a stud arranged in the swivelling axis. If necessary, said stud may be provided on its periphery with a tension sleeve in order to better be able to intercept occurring lateral forces.

The invention is explained in more details according to the drawing.

DESCRIPTION OF THE PREFERRED EMBODIMENT(S)

Figure 1:
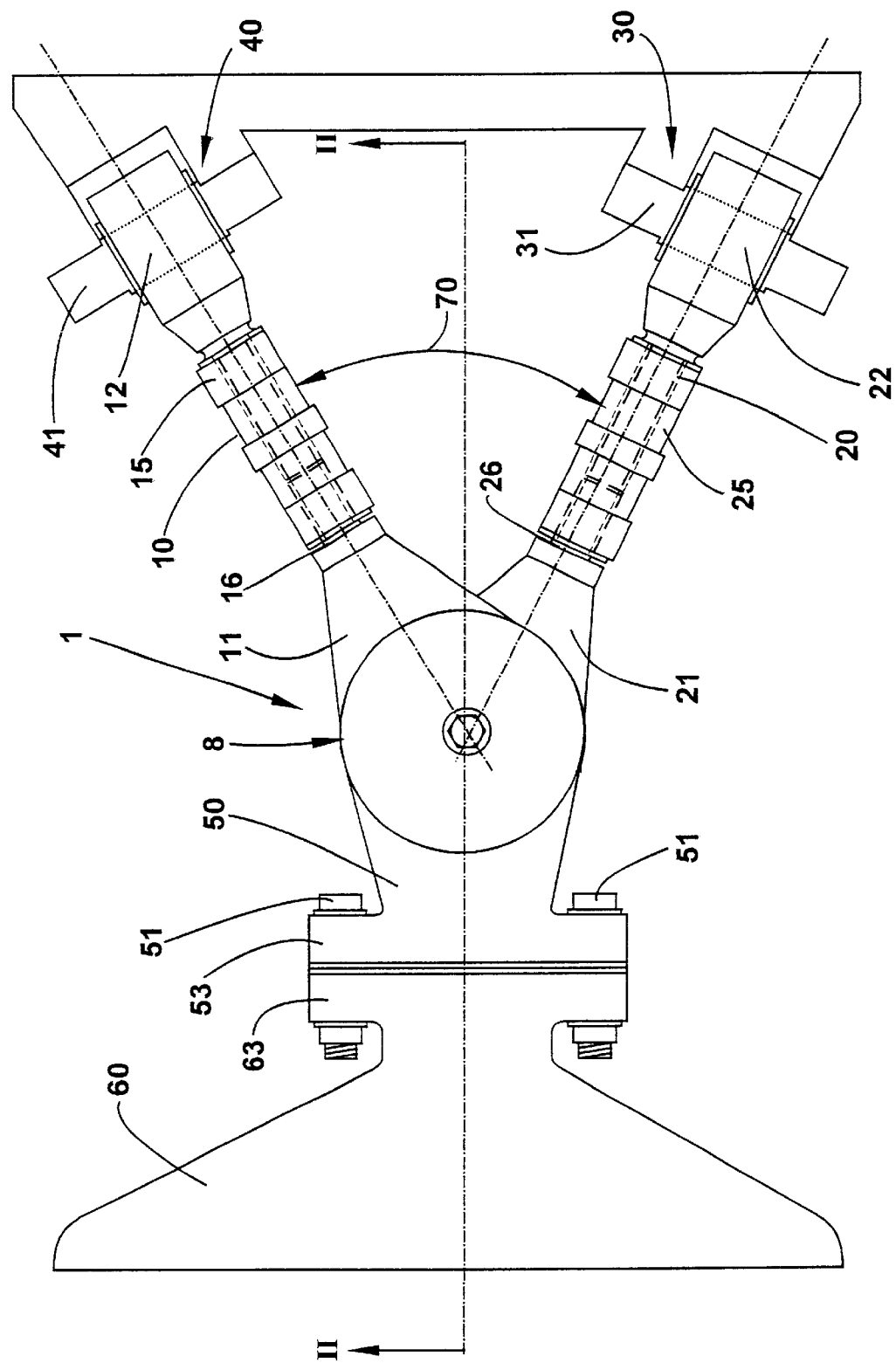
FIG. 1 shows a top view of the swivel joint.

The upper swivel joint referred to as a whole with numeral 1 is showing the two guide rods 10, 20 arranged in an angle relative to each other, said guide rods being each provided at one of their ends with the claw element 11, 21, whereas the two claw elements 11, 21 are constituting the claw 8. On the other, opposite end, each guide rod 10, 20 shows a guide rod eye 12, 22 used for the connection with the axis 31, 41 of a bearing bracket referred to as a whole with the numerals 30 and 40 respectively, said bearing bracket being arranged on the coach body of the other vehicle. The length of each of the guide rods 10, 20 may moreover be varied. To change the length of the guide rods 10, 20, each guide rod is provided with a threaded bush 15, 25 and with a threaded stem 16, 26, both being arranged in such a way that they may be screwn into each other.

Figure 2:
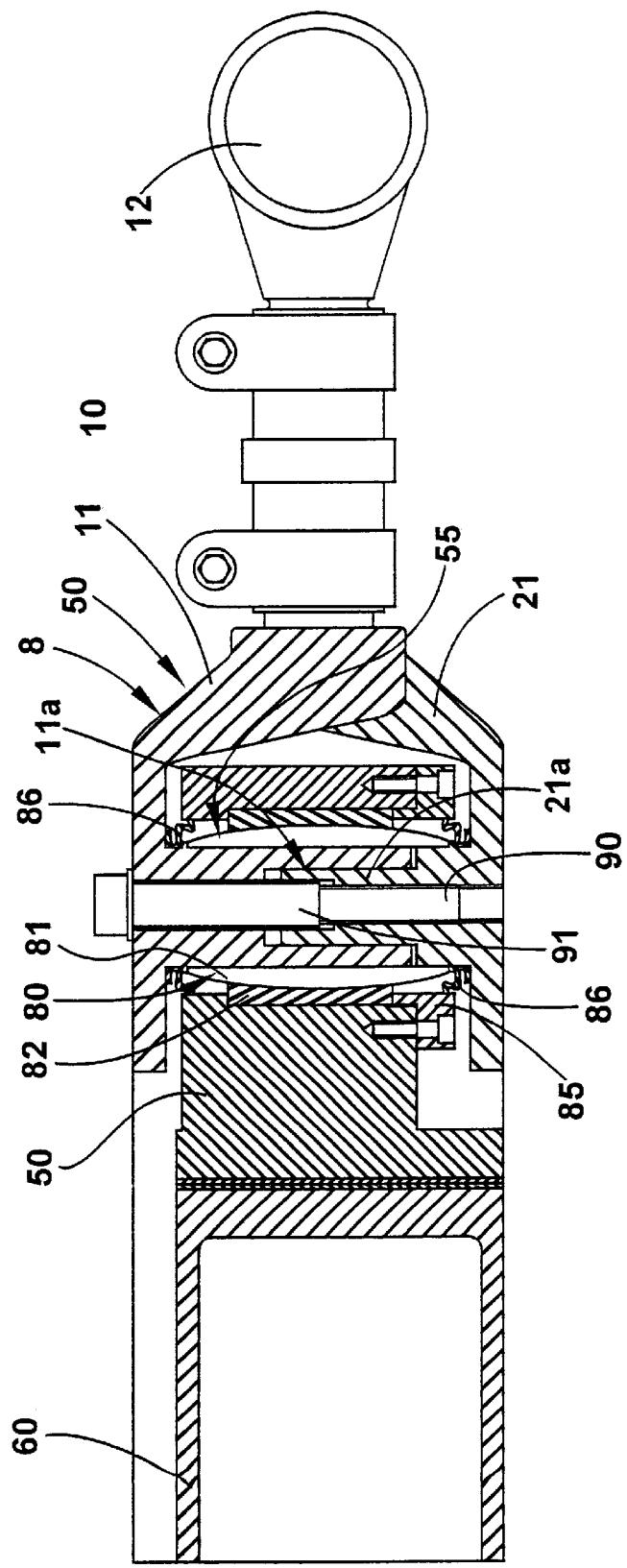
FIG. 2 shows a section along the line II—II of FIG. 1.

The swivel joint 1 is also provided with the arm 50 that is fastened on the support 60 by means of the stud 51. The support 60 may be fixed on one part of the vehicle. The spacing of the swivel point to the neighboured vehicle may be varied by placing plain washers between the flange 53 of the rod 50 and the flange 63 of support 60. The object of this configuration is to align the swivelling axis of the two swivel joints arranged above each other. The connection of the two claw elements 11, 21 may be seen in detail in the sectional view represented in FIG. 2. FIG. 2 indeed shows that the upper claw element 11 is provided with a claw mortise 11a into which a corresponding tenon 21a of the lower claw element 21 is fitting. It is hereby important that there is a clearance fit between the claw mortise 11a and the tenon 21, said clearance fit making a rotation of the two claw elements 11, 21 relative to each other possible. The object thereof is to change the angle referred to as a whole with numeral 70 (FIG. 1) in such a way that the guide rods 10, 20 may be received by the bearings 30, 40 with a corresponding compensation of tolerances.

In order to enable the claw 8 consisting of the two claw elements 11, 21 to rotate relative to the arm 50, the plain bearing referred to as a whole with numeral 80 is provided. This plain bearing 80 consists in a spheroidal case 81 having on its periphery a joint shell 82 in which the spheroidal case 81 is rotatably born. Said joint shell 82 is fastened in the joint's eye 55 of the arm 50 by means of the tension ring 85. Seals 86 are preventing the spheroidal case 81 from getting dirty.

The stud 90 is connecting the two claw elements 11, 21 and tightens the spheroidal case 81. It is provided with a sleeve 91 that intercepts possibly occurring lateral forces.

I claim:

1. First and second hinge-linked vehicles and a swivel joint (1) mounted in a ceiling area between the first and second hinge-linked vehicles, said swivel joint comprising an arm (50) arranged on and at one end to the first vehicle, said arm of said swivel joint having an opposite end which is rotatably seizable by a claw (8), said claw (8) being provided with two relatively rotatable claw elements (11, 21) which are constructed and arranged to receive two relatively angled guide rods (10, 20) for connection with the second vehicle, and each guide rod (10, 20) being adjustable in length.

2. The first and second hinge-linked vehicles and the swivel joint according to claim 1, characterized in that the claw (8) is provided with a plain bearing (80) ensuring a pivotable connection with the arm (50) of the first vehicle.

3. The first and second hinge-linked vehicles and the swivel join according to claim 2, characterized in that the plain bearing (80) is provided with a spheroidal case (81) having on its outer periphery a joint shell (82) that is fastened in a joint eye (55) of the arm (50).

4. The first and second hinge-linked vehicles and the swivel joint according to claim 3, characterized in that a tension ring (85) is provided to fasten the joint shell (82) in the joint eye (55) of the arm (50).

5. The first and second hinge-linked vehicles and the swivel joint according to claim 1, characterized in that the one claw element (1) is provided with a claw mortise (11a) into which a tenon (21a) of the other claw element (20) engages with a clearance fit being provided between the tenon and the mortise.

6. The first and second hinge-linked vehicles and the swivel joint according to claim 1, characterized in that a stud (90) is provided together with a tension sleeve (91) to connect the two claw elements (11, 21).

7. The first and second hinge-linked vehicles and the swivel joint according to claim 1. characterized in that each guide rod (10, 20) is provided on its end with a guide rod's eye (12, 22) for the connection with the second vehicle.

8. The first and second hinge-linked vehicles and the swivel joint according to claim 1 wherein said first and second vehicles are rail vehicles.

* * * * *